United States Patent [19]

Choe et al.

[11] Patent Number: 5,624,754

[45] Date of Patent: Apr. 29, 1997

[54] RUBBER-POLYESTER COMPOSITES INCLUDING A SIDECHAIN CONTAINING COPOLYESTER

[75] Inventors: Eui W. Choe, Randolph; Charles E. Forbes, Bridgewater, both of N.J.; Jennifer A. Filbey, Charlotte; Stephan F. Sherriff, Salisbury, both of N.C.

[73] Assignee: Hoechst Celanese Corp., Somerville, N.J.

[21] Appl. No.: 548,396

[22] Filed: Oct. 26, 1995

[51] Int. Cl.[6] ............................ D02G 3/00; B32B 27/34
[52] U.S. Cl. ........................... 428/373; 428/374; 428/395
[58] Field of Search ............................ 428/373, 374, 428/395

[56] References Cited

U.S. PATENT DOCUMENTS 5,372,885  12/1994  Tabor et al. ............................ 428/373

Primary Examiner—Paul R. Michl
Assistant Examiner—Patrick Niland
Attorney, Agent, or Firm—Michael W. Ferrell

[57] ABSTRACT

The present invention is generally directed to multi-component rubber-polyester composites including a sidechain containing copolyester as a compatibilizing component.

14 Claims, 3 Drawing Sheets

1

RUBBER-POLYESTER COMPOSITES INCLUDING A SIDECHAIN CONTAINING COPOLYESTER

TECHNICAL FIELD

The present invention relates generally to multi-component rubber/polyester composites including a compatibilizing copolyester. The compatibilizing copolyester is a sidechain-containing polyester which interacts favorably with rubber and with a polyester of an alkylene glycol and an aromatic diacid. Particularly preferred embodiments include bilayer fibers with a sheath of the compatibilizing copolyester melt-blended with a rubber component as well as bicomponent fibers embedded in a rubber matrix, while other embodiments are described and claimed herein.

CROSS REFERENCE TO RELATED CASES

The subject matter of this application relates to the subject matter of the following cases being filed concurrently herewith:

1. U.S. patent application Ser. No. 548,635 filed Oct. 26, 1995, entitled RUBBER-POLYESTER COMPOSITES INCLUDING A FUNCTIONALLY TERMINATED COPOLYESTER.

2. U.S. patent application Ser. No. 548,769 filed Oct. 26, 1995, entitled RUBBER-POLYESTER COMPOSITES INCLUDING POLYSTYRENE-POLYESTER COPOLYMERS.

3. U.S. patent application Ser. No. 548,890 filed Oct. 26, 1995, entitled BILAYER FILAMENTS AND FUSED CORD THEREOF.

BACKGROUND

Non-metallic fibers useful for rubber reinforcement and especially for tire reinforcement include relatively high denier nylons, rayon, as well as polyester. A particularly preferred polyester is poly(ethylene terephthalate). Because mechanical properties are important, it is typical to employ yarns made up of highly oriented filament which may be prepared in a variety of ways. With respect to poly(ethylene terephthalate) one process involves spinning the yarn to a relatively low birefringence (<0.009) and then drawing the yarn. For example see: U.S. Pat. Nos. 3,216,187 or 3,361,859. Another process involves spinning the yarn to a relatively higher birefringence (i.e. 0.009) and drawing off-line. For example see: U.S. Pat. No. 4,973,657. Another process involves spinning the yarn and subsequently draw-twisting the yarn. The preferred process involves spinning the yarn to a relatively high birefringence (i.e. 0.009) and drawing in-line. For example see: U.S. Pat. Nos. 4,101,525; 4,195,052; 4,414,169; 4,690,866; 4,551,172; 4,827,999; 4,491,657, 5,067,538, 5,132,067; and 5,234,764. Preparation of the yarn is merely the first step, since the yarns must be suitably adhered to the rubber components in order to impart the desired properties to the end product.

In connection with tire manufacture, it is typical to manufacture specialized fabrics which are coated with rubber for use in plies, breakers, chippers and belts. Initial manufacture consists of spinning and drawing the yarns as noted above as well as applying a finish. The yarn is twisted into plies, cabled into cords, woven into fabrics, and treated with an adhesive dip prior to being coated with rubber. To facilitate processing with adhesives and calendaring with rubber, the cables are woven into a fabric, for example of 23–35 ends per inch with a minimum number of filament yarns or staple fiber pick threads, also called fill threads or weft. The fabric is dip-coated with an adhesive which bonds with rubber. The adhesives are most commonly aqueous systems including rubber latex, resorcinol and formaldehyde which are allowed to partially react before dip application.

The multi-step yarn pre-treatment process involved in tire manufacture is of course expensive, both in terms of capital expenditure and processing costs; especially in connection with weaving, adhesive application, and environmental control costs, which expenses are interrelated inasmuch as the weaving step is required in large part to facilitate adhesive application.

Bilayer spinning of synthetic fibers has been employed to provide fibers with a surface layer more suitable for a given end use. Rayon/nylon bicomponent fibers are shown, for example, in U.S. Pat. No. 5,272,005; while U.S. Pat. No. 5,227,109 discloses bicomponent fibers with a poly(ethylene terephthalate) core and a copolyester sheath. Perhaps more notably, U.S. Pat. No. 4,987,030 shows a polyester core/nylon sheath bicomponent fiber useful as rubber reinforcement. Additional multilayer fibers and cords may be seen in the following U.S. Pat. Nos.: 4,520,066; 4,129,692; 4,024,895; 3,839,140; 3,645,819.

SUMMARY OF INVENTION

There is provided in accordance with the present invention a multi-component rubber polyester composite comprising as a first component a rubber, as a second component a linear polyester of an alkylene glycol and an aromatic diacid, and as a third component a sidechain containing copolyester having the repeating units:

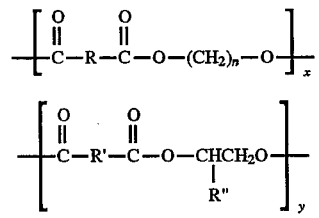

where R and R' are aryl groups which may be the same or different, R" is a sidechain containing at least 3 carbon atoms, n is an integer from 2–10 and x and y are integers with the proviso that the ratio from x:y is from 99:1 to 50:50. The third component copolyesters enhance adhesion between the rubber component and the linear polyester. Such enhancement may be due to transesterification, co-solidification or improved miscibility and co-crystallization. Additional components are added as desired in for example a sheath/core filament.

In another aspect of the present invention, preferred R" groups are the residue of glycerides of unsaturated fatty acids such as linoleic acid, oleic acid and 9,11-octadecadienoic acid. Other glycerides, that is, the 1,2,3, propane triol esters of other organic fatty acids such as stearic or palmitic acid may also be employed.

BRIEF DESCRIPTION OF THE DRAWINGS

The invention is described in detail below in connection with various synthetic examples and drawings. In the drawings.

DETAILED DESCRIPTION

Figure 1:
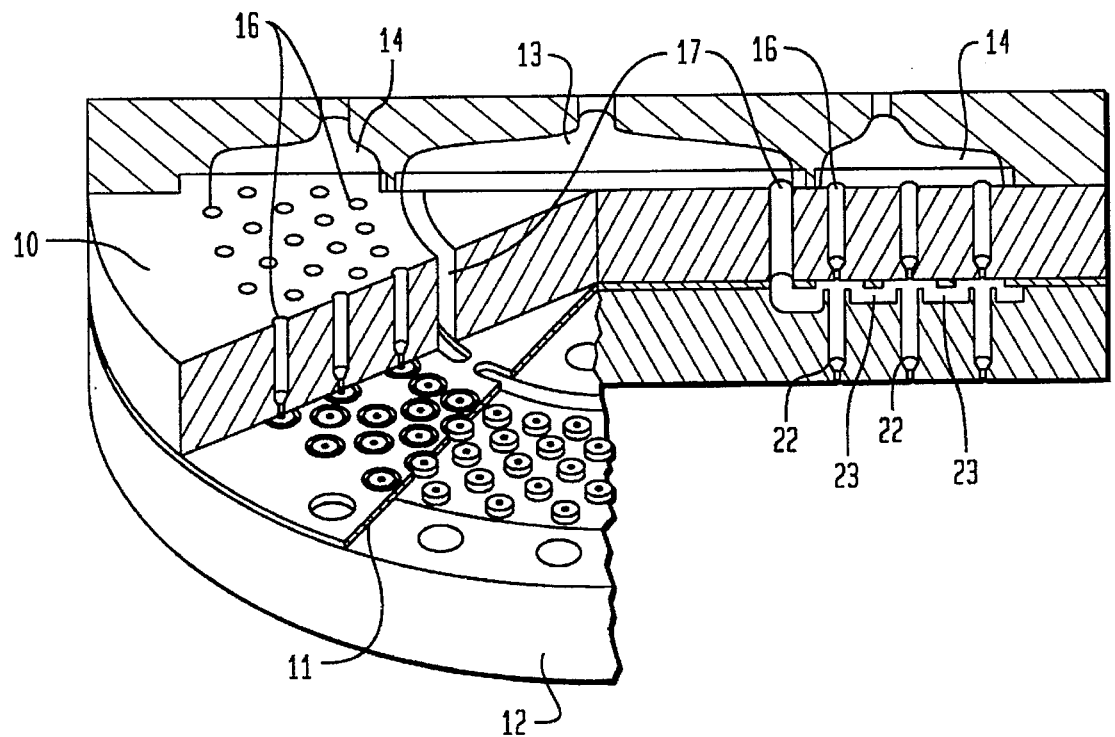
FIG. 1 is a view in perspective and partial section of a spin pack assembly.

The present invention is described in detail below in connection with numerous examples which are provided for purposes of illustration only and are not intended to limit the invention in any way, which invention is defined in the appended claims. The core or sheath polymer may be a polyester of different molecular weights for example, depending on the desired properties. Polyesters may be prepared from the dimethyl esters of an aromatic diacid and a glycol or directly from the acid and the glycol if so desired. If a particularly high molecular weight product is desired, it is customary to subject an intermediate or high molecular weight polyester product to solid state polymerization under vacuum or in an inert atmosphere.

Linear polyesters which may be employed in practicing the present invention include polyesters of alkylene glycols and aromatic acids such as: poly(alkylene terephthalates) having the repeating unit

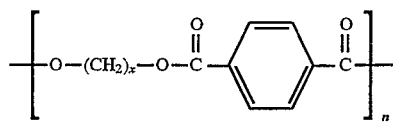

where X=2–10 and preferably 2–4 and n is an integer throughout this section;
copolymers including (alkylene isophthalates) having the repeating unit

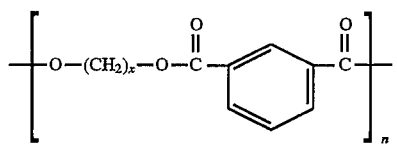

where X=2–6 and preferably 2 or 4;
poly(alkylene 4,4'bibenzoates) having the repeating unit

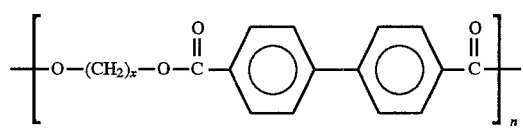

where X=2–10 with X=2–6 being preferred;
poly(alkylene 2,6 naphthalene-dicarboxylates) having the repeating unit

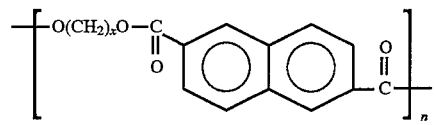

where X=2–10 and preferably 2–4;
poly(alkylene sulfonyl-4,4'-dibenzoates) having the repeating unit

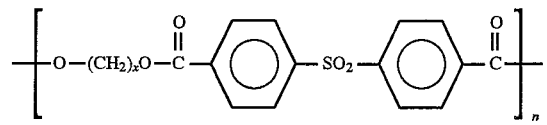

where X=2–10, preferably 2–6;
poly(p-phenylene alkylene dicarboxylates) having the repeating unit

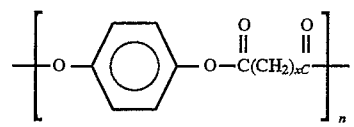

where X=1–8 and preferably 1–4;
Poly(p-xylylene aklylene dicarboxylates) having the repeating unit:

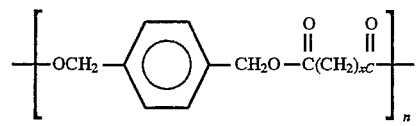

where X=1–10 and preferably 2;
as well as Poly(p-phenylene dialkylene terephthalates) having the repeating unit

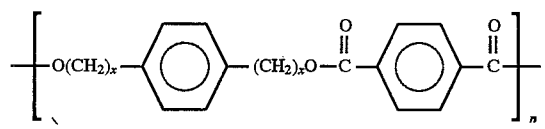

where X=1–5 and preferably 1, 2 and 4.

As will be appreciated by those of skill in the art, the foregoing list is by no means exhaustive and it is sometimes desired to employ terepolymers and linear polyesters with even more monomers. Particularly desirable terepolymers might include poly(alkylene terephthalate-co-4,4'-bibenzoate), and poly(alkylene 4,4'-bibenzoate-co-2,6 naphthalene dicarboxylates). These polymers are disclosed in U.S. Pat. Nos. 3,008,934, 4,082,731 and 5,453,321 as well as European Application No. 0 202 631. The molecular weight, spinning, drawing fibers and the like will depend on the desired end-use of the product.

So also, other monomeric components may be utilized in the sheath or core polymers. Cyclohexanedimethanol, available from Eastman Chemical Company may be used in polyesters in accordance with the present invention. Cyclohexanedimethanol may be employed in the cis or trans form.

Any suitable, melt processable rubber or rubber blend may be employed in connection with the present invention, such as natural rubber, synthetic 1,4-polyisoprene, polybutadiene rubber, poly(butadiene-co-styrene), poly(isobutylene-co-isoprene), poly(ethylene-co-propylene-co-diene), styrene-isoprene rubbers and the like if the rubber is melt-processable under the conditions of interest. Particularly preferred rubbers are block copolymer rubbers, also referred to as thermoplastic elastomers herein and further described below. Ethylenepropylene rubbers (EPR) or ethylene-propylene-diene monomer (EPDM) rubbers are important commercial materials which may also be employed trader suitable conditions.

Generally speaking, the thermoplastic elastomers useful in connection with the present invention are multiphase compositions in which the phases are intimately dispersed. In many cases, the phases are chemically bonded by block or graft copolymerization. In others, a fine dispersion is apparently sufficient. At least one phase consists of a material that is hard at room temperature but fluid upon heating. Another phase consists of a softer material that is rubberlike at room temperature. A simple structure is an A-B-A block copolymer, where A is a hard phase and B an elastomer or soft phase, eg, poly(styrene-elastomer-styrene).

Most polymers are thermodynamically incompatible with other polymers, and mixtures separate. This is true even when the polymeric species are part of the same molecule, as in these block copolymers. With respect to poly(styrene-elastomer-styrene) copolymers, the polystyrene and segments form separate regions, ie, domains, dispersed in a continuous elastomer phase. At room temperature, these polystyrene domains are hard and act as physical cross-links, tying the elastomer chains together in a three-dimensional network. In some ways, this is similar to the network formed by vulcanizing conventional rubbers using sulfur cross-links. The main difference is that in thermoplastic elastomers, the domains lose their strength when the material is heated or dissolved in solvents. This allows the polymer or its solution to flow. When the material is cooled down or the solvent is evaporated, the domains harden and the network regains its original integrity. This explanation of the properties of thermoplastic elastomers has been given in terms of a poly(styrene-elastomer-styrene) block copolymer, but it would apply to any block copolymer with the structure A-B-A; A-B diblock or (A-B)$_n$ repeating block polymers or multiblock. In principle, A can be any polymer normally regarded as a hard thermoplastic, eg, polystyrene, poly(methyl methacrylate), polypropylene, and B can be any polymer normally regarded as elastomeric, eg, polyisoprene, polybutadiene, polyisobutylene, polydimethylsiloxane (see Table 1). Note also that a styrene-ethylene butylene-styrene (SEBS) saturated elastomer type polymer may be used in connection with the present invention.

TABLE 1

THERMOPLASTIC BLOCK COPOLYMERS

| Hard segment, A | Soft or elastomeric segment, B | Typical Structure |
|---|---|---|
| polystyrene | polybutadiene, polyisoprene | A—B—A |
| poly(α-methylstyrene) | polybutadiene, polyisoprene | A—B—A |
| polystyrene | poly(ethylene-co-butylene) | A—B—A |
| polyethylene | poly(ethylene-co-butylene) | A—B—A |
| polystyrene | polydimethylsiloxane | A—B—A |
| poly(α-methylstyrene) | polydimethylsiloxane | A—B—A and (A—B)$_n$ |
| polysulfone | polydimethylsiloxane | (A—B)$_n$ |
| poly(siphenylene siloxane) | polydimethylsiloxane | (A—B)$_n$ |
| polyurethane | polyester or polyether | (A—B)$_n$ |
| polyester | polyether | (A—B)$_n$ |
| polycarbonate | polydimethylsiloxane | (A—B)$_n$ |
| polycarbonate | polyether | (A—B)$_n$ |

The three commercially important block copolymers are poly(styrene-elastomer-styrene), thermoplastic polyurethanes, and thermoplastic polyesters.

Commercially available block copolymer thermoplastic elastomers appear in Table 2 below.

TABLE 2

TRADE NAMES AND MANUFACTURERS OF THERMOPLASTIC ELASTOMERS

| Trade Name | Manufacturer | Type | Hard segment | Soft segment |
|---|---|---|---|---|
| Kraton D | Shell Chemical Co. | triblock (S—B—S or S—I—S) | S | B or I |
| Solprene 400 | Phillips Petroleum Co. | branched (S—B)$_n$ (S—I)$_n$ | S | B or I |
| Stereon | Firestone Co. | triblock (S—B—S) | S | B |
| Tufprene | Asahi | triblock (S—B—S) | S | B |
| Europrene SOL T | Enichem | triblock (S—B—S) or (S—I—S) | S | B or I |
| Kraton G | Shell Chemical Co. | triblock (S—EB—S) | S | EB |

TABLE 2-continued

TRADE NAMES AND MANUFACTURERS OF THERMOPLASTIC ELASTOMERS

| Trade Name | Manufacturer | Type | Hard segment | Soft segment |
|---|---|---|---|---|
| Elexar | Shell Chemical Co. | triblock (S—EB—S) and (S—B—S) | S | EB or B |
| Riteflex | Hoechst Celan | | polyester | polyether |

S = Polystyrene;
B = Polybutadiene
I = Polyisoprene,
EB = Poly(ethylene-co-butylene)

Riteflex is a multiblock $(A-B)_n$ type elastomer wherein, A the hard segment is poly(butylene terephthalate) and B, the soft segment is poly(tetramethylene ether).

Rubbers useful in connecting with the present invention are those which are easily melt-processed with the sheath and core polymers, for example, which may be melt blended and co-extruded with a polyester forming the sheath of a heterofilament. Rubbers such as natural rubber or synthetic cis-isoprene rubber may be employed provided they have suitable flow characteristics.

Especially preferred thermoplastic elastomers are the styrene-elastomer-styrene block copolymers described above.

The sidechain containing copolyesters of the present invention promote adhesion between the linear polyester and rubber components described above. Particular polymers are exemplified below. These polymers melt at a temperature well below that of the linear polyester of the second component. Preferably they are fully melted (readily melt processable) at a temperature of at least 5° C. below the crystalline melting point of the second component linear polyester.

EXAMPLE 1

Sidechain Containing Copolyester

In a 1 liter three-necked resin flask equipped with nitrogen inlet and outlet, thermometer, condenser and mechanical stirrer, were placed 388 grams (2 moles) of dimethyl terephthalate, 399.6 grams (4.44 moles) of 1,4-butanediol, 23.39 grams (0.16 moles) of 1,2-octanediol and 0.346 grams of titanium isopropoxide. The mixture was heated at 210° C. for 2 hours while distilling out methanol. The resulting mixture was heated to 250° C. for 30 minutes and then vacuum was applied for 4 hours. The resulting polymer was cooled to room temperature to obtain copolyester with an intermediate molecular weight, I.V. 1.2 dl/g as determined at 25 degrees and 0.1% concentration in HFIP/PFP 50/50. Tmp 222° C. (by DSC); heat of fusion 44 j/g. This copolyester has the structure:

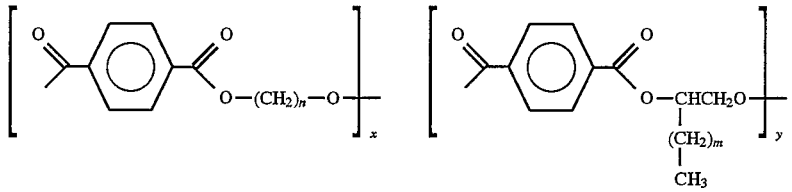

where x:y=92:8, n=4, and m=5.

The fiber properties of drawn single-filament are denier/tenacity/elongation/modulus 37.7/4.7 gpd/23%/31 gpd. The inherent viscosity was increased to 1.8 dL/g by solid state polymerization at 200° for 20 hours under vacuum.

EXAMPLE 2

Sidechain Containing Copolyester

In a 1 liter three-necked resin flask equipped with nitrogen inlet and outlet, thermometer, condenser and mechanical stirrer, were placed 388 grams (2 moles) of dimethyl terephthalate, 41.34 grams (0.16 moles) of 1,2-hexadecanediol and 0.346 grams titanium tetraisopropoxide. The mixture was heated at 210° C. for 2 hours while distilling out methanol. To the reaction flask, was added 399.6 grams (4.44 moles) of 1,4-butanediol. The resulting mixture was heated at 210° C. for 2 more hours and then at 250° C. for 30 minutes, and then vacuum was applied for 6 hours. The resulting polymer was cooled to room temperature to obtain copolyester with an intermediate molecular weight, I.V. 0.98 dL/g as determined at 25 degrees and 0.1% concentration in HFIP/PFP 50/50: Tmp 215° C. (by DSC); heat of fusion 33 j/g. This copolyester has the structure:

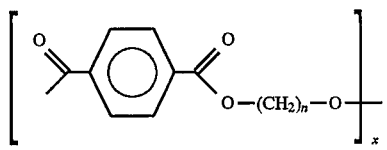 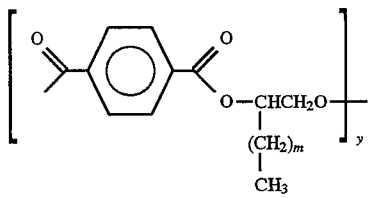

where x:y=92:8, n=4, and m=13.

The inherent viscosity was increased to 1.35 d/L/g by solid state polymerization at 200° C. for 20 hours under vacuum. This polymer was spun at 283° C. and drawn at a draw ratio of 6.8 to obtain fiber properties of denier grams/ tenacity, gpd/elongation, %/modulus, gpd, 66/0.77/479/13.7 as spun and 9.7/7.7/17/30.2 after drawing.

EXAMPLE 3

Sidechain Containing Copolyester

In a 1 liter three-necked resin flask equipped with nitrogen inlet and outlet, thermometer, condenser and mechanical stirrer, were placed 194 grams (1 moles) of dimethyl terephthalate, 64.60 grams (0.25 moles) of 1,2-hexadecanediol and 0.173 grams of titanium tetraisopropoxide. The mixture was heated at 210° C. for 2 hours while distilling out methanol. To the reaction flask, was added 184.5 grams (2.05 moles) of 1,4-butanediol. The resulting mixture was heated at 210° C. for 2 more hours and then at 250° C. for 30 minutes, and then vacuum was applied for 6 hours. The resulting polymer was cooled to room temperature to obtain copolyester with an intermediate molecular weight, I.V. 0.64 dL/g as determined at 25 degrees and 0.1% concentration in HFIP/PFP 50/50: Tmp 191° C. (by DSC); heat of fusion 26 j/g; Tg 41° C. The polymer was spinnable and the resulting fiber was drawable.

This copolyester product has the structure:

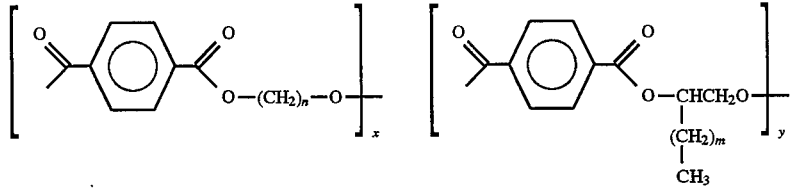

where x:y=75:25, n=4, and m=13.

EXAMPLE 4

Sidechain Containing Copolyester

In a 1 liter three-necked resin flask equipped with nitrogen inlet and outlet, thermometer, condenser and mechanical stirrer, were placed 194 grams (1 moles) of dimethyl terephthalate, 129.20 grams (0.5 moles) of 1,2-hexadecanediol and 0.173 grams of titanium tetraisopropoxide. The mixture was heated at 210° C. for 2 hours while distilling out methanol. To the reaction flask, was added 162.2 grams (1.8 moles) of 1,4-butanediol. The resulting mixture was heated at 210° C. for 2 more hours and then at 250° C. for 30 minutes, and then vacuum was applied for 7.5 hours. The resulting polymer was cooled to room temperature to obtain copolyester with an intermediate molecular weight, I.V. 0.25 dL/g as determined at 25 degrees and 0.1% concentration in HFIP/PFP 50/50: Tmp 149° C. (by DSC); heat of fusion 25 j/g; Tg −13° C.

The copolyester product has the structure:

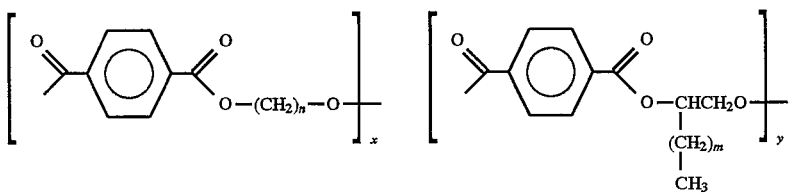

where x:y=50:50, n=4, and m=13.

EXAMPLE 5

Sidechain Containing Copolyester

In a 1 liter three-necked resin flask equipped with nitrogen inlet and outlet, thermometer, condenser and mechanical stirrer, were placed 24.92 grams (0.15 moles) of isophthalic acid, 141.2 grams (0.85 moles) of terephthalic acid, 175.95 grams (1.95 moles) of 1,4-butanediol, 53.48 grams (0.15 moles) of Monoolein. The mixture was heated at 220° C. for 1 hour while distilling out water. The temperature of the resulting mixture was raised to a maximum of 275° C. at a rate of 10° C. per hour, and then vacuum was applied for 1.5 hours. The resulting polymer was cooled to room temperature to obtain copolyester with an intermediate molecular weight, I.V. 0.92 dL/g as determined at 25 degrees and 0.1% concentration in HFIP/PFP 50/50: Tmp 138° C. (by DSC); heat of fusion 6 j/g. This copolyester has the general structure:

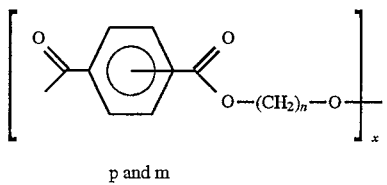 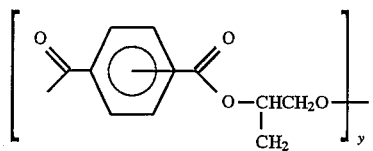

Where x:y=85:15, p:m=85:15, and n=4; and where p and m indicate a meta and para linkage respectively. The meta linkage is achieved by using isophathalic acid whereas the para linkage is achieved by using terephathalic acid.

EXAMPLE 6

Sidechain Containing Copolyester

In a 1 liter three-necked flask equipped with nitrogen inlet and outlet, thermometer, condenser and mechanical stirrer, were placed 24.9 grams (0.15 moles) of isophthalic acid, 141.2 grams (0.85 moles) of terephthalic acid, 155.25 grams (1.725 moles) of 1,4-butanediol, 89.14 grams (0.25 moles) of Monoolein. The mixture was heated at 220° C. for one hour while distilling the water. The temperature of the resulting mixture was raised to a maximum of 275° C. at a rate of 10° C. per hour, and then vacuum was applied for 2 hours. The resulting polymer was cooled to room temperature to obtain copolyester with an intermediate molecular weight: Tmp 138° C. (by DSC); heat of fusion 5 j/g.

This copolyester has the general formula:

EXAMPLE 7

Sidechain Containing Copolyester

In a 1 liter three-necked flask equipped with nitrogen inlet and outlet, thermometer, condenser and mechanical stirrer, were placed 241.53 grams (0.25 moles) of isophthalic acid, 124.59 grams (0.75 moles) of terephthalic acid, 155.25 grams (1.725 moles) of 1,4-butanediol, 89.14 grams (0.25 moles) of Monoolein. The mixture was heated at 220° C. for one hour while distilling the water. The temperature of the resulting mixture was raised to a maximum of 275° C. at a rate of 10° C. per hour, and then vacuum was applied for 3 hours. The resulting polymer was cooled to room temperature to obtain copolyester with an intermediate molecular weight I.V. 0.80 dL/g as determined at 25 degrees and 0.1% concentration in HFIP/PFP 50/50: Softening point 125° C.; Tg −9° C.; heat of fusion 0 j/g.

This copolyester has the general formula:

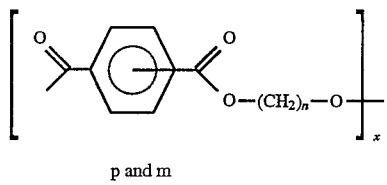 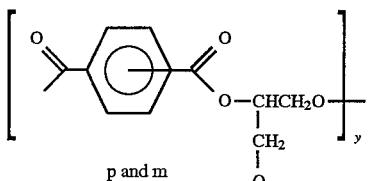

where x:y=75:25, p:m=85:15, and n=4; and p and m are defined as above.

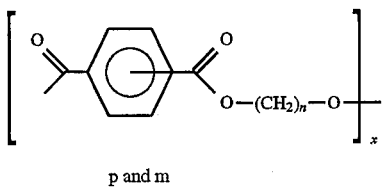

p and m

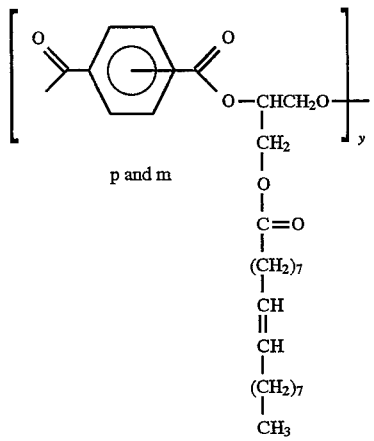

p and m where x:y=75:25, p:m=75:25, and n=4 and terms are defined as above.

EXAMPLE 8–15

Following the procedure of example 1, the 1,2-diols listed below are substituted for 1,2-octanediol.

Ex. 8 1,2-propane diol

Ex. 9 1,2-butane diol

Ex. 10 1,2-pentane diol

Ex. 11 1,2-hexane diol

Ex. 12 1,2-decane diol

Ex. 13 1,2-dodecanediol

Ex. 14 1,2-tetradecanediol

Ex. 15 1,2-hexadecane diol

Alkyl chains of up to 30 carbon atoms may be employed if so desired.

EXAMPLES 16–18

Following the procedure of Example 6 above, glycerides of the following fatty acids were substituted for the glyceride of oleic acid:

Ex. 16 glyceride of linolenic acid

Ex. 17 glyceride of linoleic acid

Ex. 18 glyceride of 9,11-octadecadienoic acid

EXAMPLE 19

Sidechain Containing Copolyester

In a 1 liter three-necked resin flask equipped with nitrogen inlet and outlet, thermometer, condenser and mechanical stirrer, were placed 194 grams (1 mole) of dimethyl terephthalate, 36.4 grams of ethylene glycol, 10.4 grams (0.1 mole) of neopentyl glycol and 0.173 grams of titanium isopropoxide. The mixture was heated at 210° C. for 2 hours while distilling out methanol. Additional 100 grams of ethylene glycol was added into the flask, and the resulting mixture was heated at 210° C. for an additional 2 hours, and at 250° C. for 30 minutes, and then vacuum was applied for 4 hours. The resulting polymer was cooled to room temperature to obtain copolyester with an intermediate molecular weight, I.V. 0.86 dL/g as determined at 25 degrees and 0.1% concentration in HFIP/PFP 50:50: Tmp 233° C. (by DSC); heat of fusion 5 j/g; Tcco 124° C.; Tg 76.

EXAMPLE 20

Sidechain Containing Copolyester

Following generally the procedure of Example 19, dimethyl terephthalate, 1,4-butanediol and neopentyl glycol are reacted in a mole ratio of 1:0.9:0:1 to prepare a suitable sheath polymer.

EXAMPLE 21

Sidechain Containing Copolyester

In a 1 liter three-necked resin flask equipped with nitrogen inlet and outlet, thermometer, condenser and mechanical stirrer, were placed 194 grams (1 mole) of dimethyl terephthalate, 20.67 grams (0.08 mole) of 1,2-hexadecanediol, 81 grams (0.9 mole) of 1,4-butanediol, and 0.173 grams of titanium tetraisopropoxide. The mixture was heated at 210° C. for 2 hours while distilling out methanol. To the reaction flask, was added 118.8 grams (1.32 moles) of 1,4-butanediol and 58.2 grams of dimer acid, Empol 1061 (Henkel Corporation). The resulting mixture was heated at 210° C. for 2 more hours and then at 250° C. for 30 minutes, and then vacuum was applied for 8 hours. The resulting polymer was cooled to room temperature to obtain elastomeric copolyester with an intermediate molecular weight, Tm 195°–200° C. (capillary melting point).

The foregoing polymers are merely illustrative of those which may be employed as the sidechain containing polyester component. In general, it is possible to substitute isophthalic acid for a portion of terephthalic acid if a lower melting point is desired, for example, or add a percentage of long chain alcohol in place of ethylene glycol or butane diol. Likewise, it is possible to introduce sidechains into polyesters by including a variety of different monomeric components to the reaction mixture. One particularly suitable component may be dimer acid, that is, as the dimer of oleic acid as it is commonly known. This acid is prepared by the addition reaction of 2 molecules of oleic acid.

Typically, commercially available materials include stabilizers, in the case of polyester, phosphorous stabilizer to sequester the catalyst as well as anti-oxidants, ultraviolet stabilizers and the like. If materials are not purchased with stabilizers already present, they may be added to the extrusion mixtures if so desired.

Filament and Cord Manufacture

Bilayer filaments in accordance with the present invention may be manufactured by any suitable technique. Preferred methods include those described in U.S. Pat. No. 4,101,525 to Davis et al for a high modulus low-shrinkage polyester yarn and U.S. Pat. No. 5,256,050 to Davies for bilayer filaments. Particularly preferred fibers and yarns are prepared by way of high stress melt spinning followed by drawing in the solid state. Generally speaking, such yarns have a tenacity of at least 7.5 grams per denier and an initial modulus of at least 100 grams per denier. The individual filaments have a denier of from about 2 to about 15 and yarns are made up of from about 6 to about 600 individual filaments. Filaments and yarn of the present invention are fabricated as described below, or one could prepare a bicomponent yarn and subsequently calendar the yarn directly with rubber, i.e. without a rubber sheath component.

Referring to the accompanying drawings and more specifically to FIG. 1, a bicomponent filament spin pack assembly is fabricated from a distributor 10, a shim 11 and a spinneret 12. Distributor 10 is positioned so as to receive melt-extruded sheath material through a channel 13 and melt-extruded core material through channel 14. Each of the sheath and core material are passed to the respective channels 13 and 14 by conventional melt extrusion, pump and filter means not herein illustrated.

The distributor 10 functions to form the core polymer into filaments and to channel the flow of sheath polymer mixture to spinneret 12. The core polymer or polymer mixture as the case may be is pumped through multiple passages 16 to the lower, even surface of distributor 10. Passages 16 can be arranged in any number of rows or columns depending upon their size, the viscosity of the polymer, the length of passages 16 and the flow characteristics of the particular core mixture. The bottom of each passage 16 is tapered to provide a core filament of the desired diameter. Although not to be limited thereto, the density of passages 16 in the distributor 10 when, for example, the core material is melted polyethylene terephthalate and the exit passage diameter is in the range from 0.1 millimeter (mm) to 1.0 mm, can be such that each passage utilizes 10 square mm of the spinneret area.

Sheath polymer mixture flowing through channel 13 is pumped to passages 17 and through passages 17 to spinneret 12. Although not to be limited thereto, the passages 17 are preferably axially positioned in distributor 10 so that upon exiting passages 17 the sheath polymer will flow radially outwardly toward the inlets of passages 22.

Figure 2:
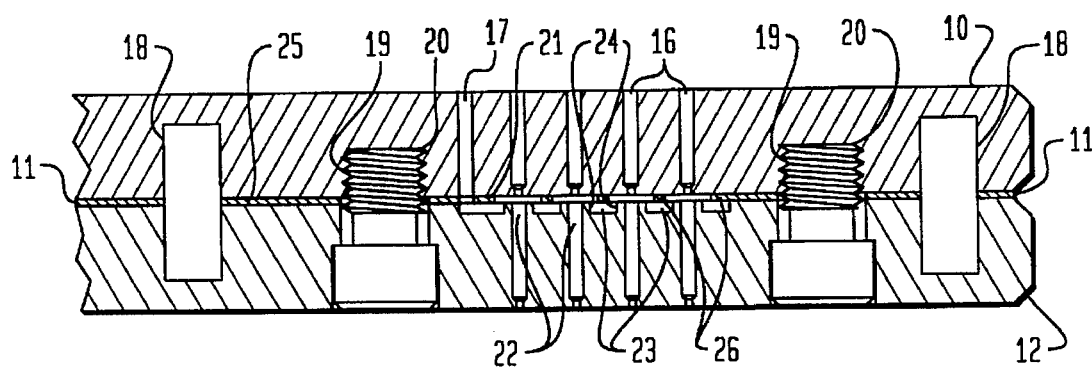
FIG. 2 is a view in vertical section of a portion of the spin pack assembly of FIG. 1.

A shim 11 is positioned between distributor 10 and spinneret 12 and maintained in fixed relationship to distributor 10 and spinneret 12 by bolts 19 engaging threaded recesses 20 in distributor 10. Distributor 10 and spinneret 12 are relatively positioned by dowel pins 18. In order to overcome bowing and separation of distributor 10 and spinneret 12 which can occur in the operation of conventional spin pack assemblies, a ring of bolts 19 has been positioned in the center of the assembly as shown in FIG. 2. The shim can be fabricated from a variety of materials such as stainless steel or brass with stainless steel being preferred. The shim can be constructed as a single unit or in two separate inner and outer pieces. The number and positioning of bolts 19 is such as to control deflection, preferably limiting deflection to less than 0.002 mm.

Shim 11 must be of substantially constant thickness, preferably having a variance in thickness of less than 0.002 mm and the circular openings 21 must be in proper alignment with distributor passages 16 and spinneret passages 22. Shims 11 of different thicknesses, normally ranging from 0.025 to 0.50 mm, are employed to adjust for changes in sheath mixture viscosity, changes in polymer flux or to change the pressure drop.

The top smooth, even surface of the spinneret 12 is recessed, providing a channel 23 for the flow of sheath mixture to each passage 22. Raised circular portions or buttons 24 surround each passage 22. The raised portions or buttons 24 project upwardly from channel 23 to a height which is equal to the top surface 25 of spinneret 12. The rate of outward flow of sheath polymer or polymer mixture through channel 23 and over the buttons 24 to passages 22 is a result of the pressure drop determined by the thickness of shim 11. The pressure drop is inversely proportioned to the third power of the height of the gap 26 between distributor 10 and spinneret 12. Close control of this gap height is effected by shim 11 and maintained by the inner circle of bolts 19. The recess depth of channel 23 is selected so as to provide a low pressure drop (normally 20–50 psi) radically across the top of the spinneret. The shim thickness is selected to normally provide a 100–1000 psi pressure drop across the raised buttons 24.

As will be evident from the drawings, each passage 22 must be in concentric alignment with its corresponding passage 16. The core polymer flows through passages 16 and passages 22, exiting spinneret 12 as the core of a bicomponent fiber. The sheath material through passages 17, channel 23 and gap 26 to form a sheath about the core producing the aforementioned bilayer fiber. The center axis of distributor passage 16 should be within a circle having a radius less than 200 microns, preferably less then 50 microns from the center axis of the spinneret counterbore.

Figure 3:
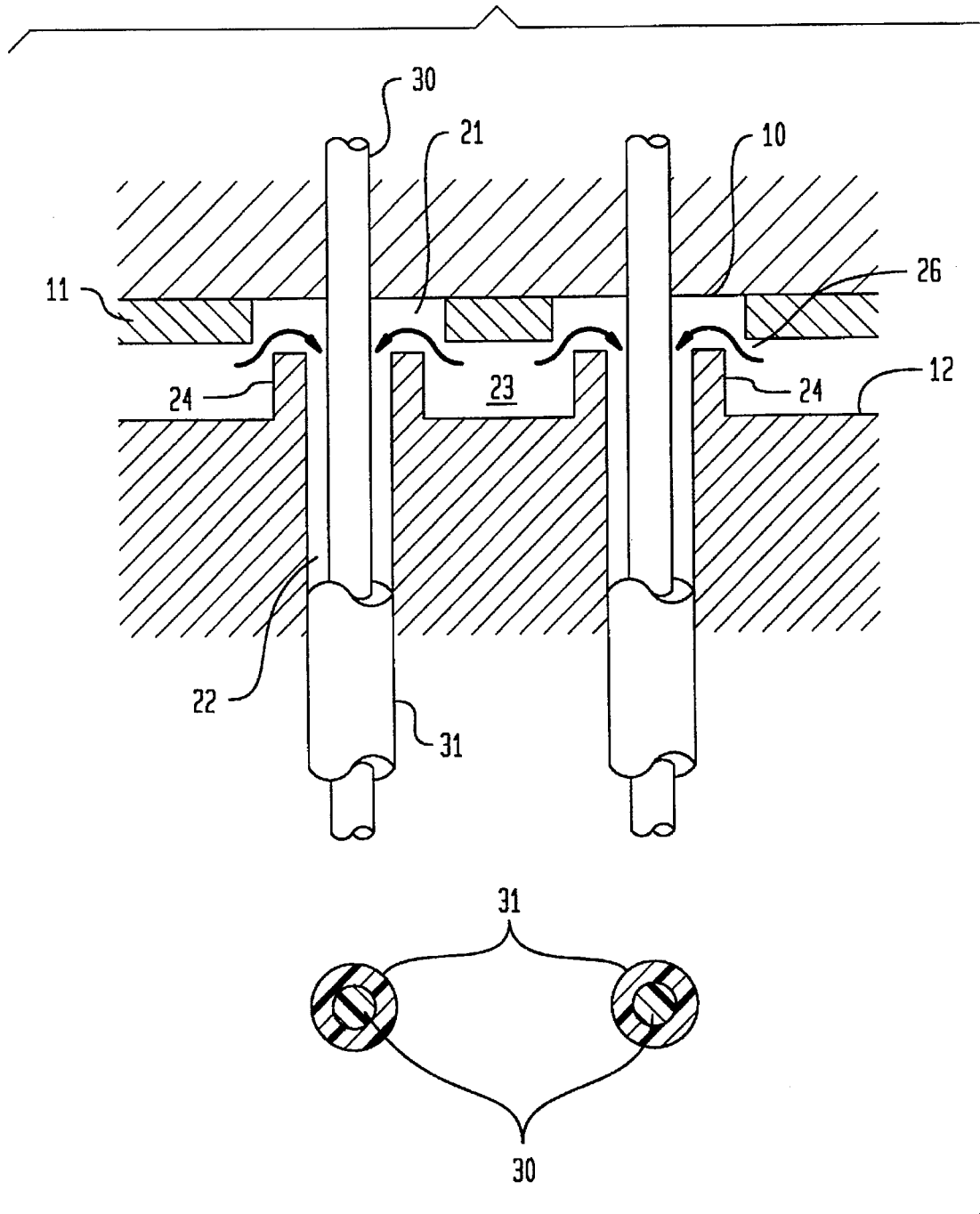
FIG. 3 is a detail in vertical section of a distributor/shim/spinneret assembly to produce concentric sheath/core heterofilaments.

The production of concentric hererofilament fibers is further illustrated in FIG. 3. shim 11 is positioned to cause sheath material 31 flowing through channel 23, over buttons 24, and through gap 26 into channel 22, forming a concentric sheath about core material polymer 30 as shown.

A sheath polymer and thermoplastic elastomer mixture for the sheath may be melt-blended and pelletized prior to extrusion, or a sheath polymer and thermoplastic elastomer may be simply added to the extrusion apparatus in appropriate proportions. The extrusion process melt-blends the components.

Figure 4:
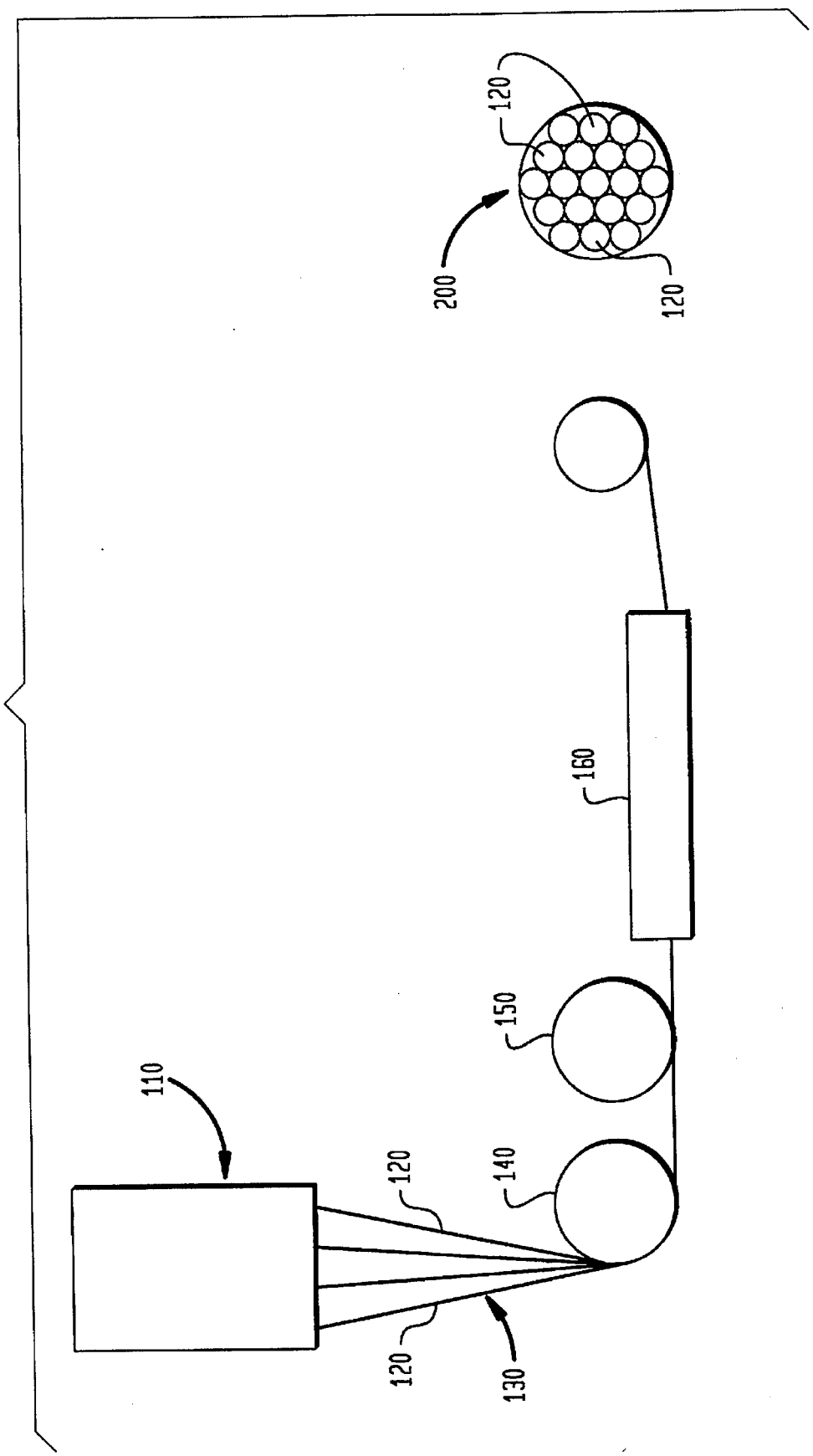
FIG. 4 is a schematic diagram showing the manufacture of fused tire cord.

Following extrusion from apparatus 10, indicated generally in FIG. 4 as apparatus 110, the multiple filaments 120 are melt spun under relatively high stress spinning conditions as described in U.S. Pat. No. 4,101,525 (i.e. a melt drawn down of at least 100:1 and as high as 3000:1, preferably 500:1 to 2000:1). The molten extrudate is solidified in the solidification zone, indicated generally at 130. Following melt solidification, the bilayer filaments are passed between rollers schematically represented as 140, 150 while being treated with steam the solid filaments are further drawn, preferably in multiple drawing steps if so desired, to impart the highest modulus and tenacity to the filaments. Most preferably, the yarn is melt-fused in oven 160 under tension at a suitable temperature to provide the multi-filament structure shown at 200, subsequent to the drawing step.

In one aspect of the present invention, three-component bilayer filaments of the present invention have a sheath: core weight ratio of from about 2:98 to about 30:70 where the sheath contains a compatabilizing polymer and a rubber. From about 5:95 to 25:75 is more typical and from 10:90 to about 20:80 sheath/core weight ratio may be preferred. A sheath composition may be predominately rubber or predominately polymer. A rubber:polymer ratio in the sheath from 99:1 to 1:99 is possible, with from 95:5 to 5:95 more typical. From 70:30 to 30:70 may be the most preferred ratio in the sheath depending on the composition. Following the procedures described above, fused cord having the composition indicated below in Table 3 is produced.

TABLE 3

Fused Cord Compositions

| A<br>Core Polymer | B<br>Sheath Polymer | C<br>Sheath Rubber | Weight Ratio<br>A:B:C |
|---|---|---|---|
| Poly(ethylene terephthalate) | Ex. 1 Copolyester | Kraton D-1111 | 80:5:15 |
| Poly(ethylene terephthalate) | Ex. 3 Copolyester | Kraton D-1102 | 80:15:5 |
| Poly(ethylene terephthalate) | Melt blend, equal parts of poly(ethylene terephthalate) and copolyester of Example 5 | Kraton D-1117 | 80:10:5 |
| Poly(ethylene terephthalate-co-bibenzoate) | Ex. 15 Copolyester | Kraton G-1652 | 80:5:15 |
| Poly(ethylene terephthalate) | Copolyester of Example 7 | Melt-blend of polyisoprene and styrene butadiene rubber, equal parts by weight | 75:15:10 |
| Poly(ethylene terephthalate) | Copolyester of Example 17 | Polyisoprene | 80:10:10 |

In another aspect of the present invention, bicomponent fibers are made consisting of a core of a linear polyester of an alkyl glycol and an aromatic diacid and sheath of the sidechain polymers described above. The bicomponent fibers are subsequently calendered with rubber. Such bilayer filaments have a sheath core ratio of from about 2:98 to about 30:70, from about 10:95 to about 25:75 being more typical and about 15:85 to about 20:80 perhaps being preferred. The rubber the bilayer fibers are calendered with is any rubber described above, and perhaps most preferably a blend of polyisoprene rubber and styrene butadiene rubber.

We claim:

1. A heterofilament comprising a core polyester formed of an aromatic diacid and an alkylene glycol and disposed thereabout a sheath of a thermoplastic elastomer melt blended with a sidechain containing copolyester comprising the repeating units:

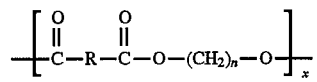

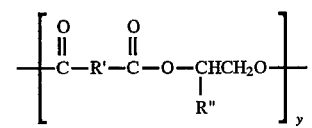

wherein R and R' are aryl groups which may be the same or different, R" is a pendant side chain of at least 3 and up to about 30 carbon atoms, n is an integer of 2–10 and x and y are integers with the proviso that the ratio of x:y is from 99:1 to 50:50.

2. The heterofilament according to claim 1, wherein said sidechain containing copolyester consists essentially of the repeating units:

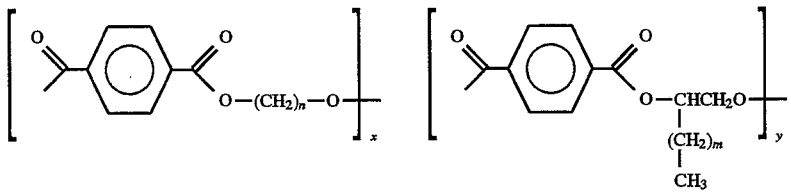

where n is an integer from 2–10, m is an integer from 0–30 and x and y are integers with the proviso that the ratio x:y is from 99:1 to 50:50.

3. The heterofilament according to claim 1 wherein said sidechain containing copolyester consists essentially of the repeating units

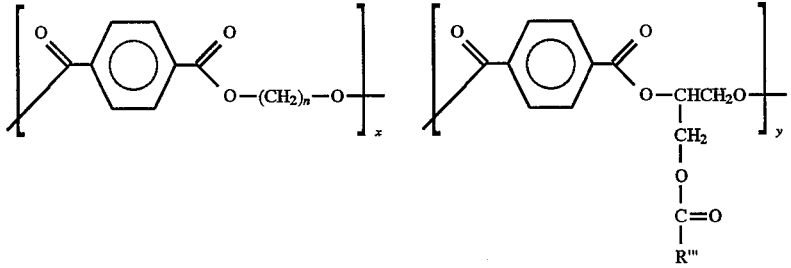

where R and R' are the same or different and are meta or para phenylene units, n is an integer from 2–10, R''' is an organic radical corresponding to the chain residue of a fatty acid glycerol ester and x and y are integers having the ratio of from 99:1 to 50:50.

4. The heterofilament according to claim 1 wherein R and R' are para phenylene units.

5. The heterofilament according to claim 1 wherein at least one of R and R' include a 4,4'-biphenylene unit.

6. The heterofilament according to claim 1 wherein at least one of R and R' include a 2,6-naphthalene unit.

7. The heterofilament according to claim 1 wherein the ratio x:y is from 95:5 to 50:50.

8. The heterofilament according to claim 1 wherein the ratio of x:y is from 92:8 to 75:25.

9. The heterofilament according to claim 1, wherein said core polyester is poly(ethylene terephthalate).

10. The heterofilament according to claim 1, wherein R" is the residue of a 1,2 alkyl glycol.

11. The heterofilament according to claim 1, wherein n=4 and R is the residue of terephthalic acid.

12. The heterofilament according to claim 1, wherein said thermoplastic elastomer is a poly(styrene-elastomer-styrene) polymer.

13. The heterofilament according to claim 1, wherein R' is the residue of a glyceride of a fatty acid.

14. The heterofilament according to claim 13, wherein said fatty acid in selected from the group consisting of linolenic acid, oleic acid, 9,11-octadecadienoic acid, stearic acid and palmitic acid.

* * * * *